(12) United States Patent
Schmid

(10) Patent No.: US 7,637,666 B2
(45) Date of Patent: Dec. 29, 2009

(54) SHAFT BEARING

(75) Inventor: Reiner Schmid, Bingen/Hochberg (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 412 days.

(21) Appl. No.: 11/711,187

(22) Filed: Feb. 26, 2007

(65) Prior Publication Data

US 2007/0211980 A1    Sep. 13, 2007

(30) Foreign Application Priority Data

Mar. 10, 2006    (DE) ................ 10 2006 011 136

(51) Int. Cl.
*F16C 27/06*    (2006.01)
(52) U.S. Cl. .................... 384/536; 384/582
(58) Field of Classification Search ............. 384/535, 384/536, 581, 582, 220, 222; 180/381
See application file for complete search history.

(56) References Cited

U.S. PATENT DOCUMENTS

| | | | | |
|---|---|---|---|---|
| 2,927,825 A | * | 3/1960 | Stone ........................ 384/536 |
| 3,243,239 A | | 3/1966 | Hackman | |
| 3,306,679 A | * | 2/1967 | Stokely ...................... 384/536 |
| 3,447,846 A | * | 6/1969 | Marsh ........................ 384/536 |
| 5,062,721 A | * | 11/1991 | Chiba ......................... 384/536 |
| 5,078,510 A | * | 1/1992 | Bair et al. ................... 384/536 |
| 5,492,415 A | * | 2/1996 | Jordens et al. .............. 384/125 |

FOREIGN PATENT DOCUMENTS

| | | |
|---|---|---|
| DE | 28 51 018 | 6/1979 |
| DE | 31 28 619 | 4/1982 |
| DE | 34 46 518 | 7/1986 |
| DE | 37 01 887 | 8/1988 |
| DE | 41 39 923 | 7/1992 |
| DE | 41 38 609 | 5/1993 |
| DE | 197 55 307 | 2/1999 |
| DE | 101 54 705 | 5/2003 |

* cited by examiner

*Primary Examiner*—Thomas R Hannon
(74) *Attorney, Agent, or Firm*—Klaus J. Bach

(57) ABSTRACT

In a shaft bearing comprising outer and inner parts with an elastic element carrier disposed therebetween, the elastic element carrier includes first and second elastic elements disposed on opposite radial sides thereof and is movable with respect to one of the outer and inner parts in axial direction and with respect to the other of the outer and inner parts in radial direction, and the elastic elements disposed between the element carrier and the outer, and respectively, the inner parts have selectable elasticities so as to provide for distinct selectible radial and axial resiliencies of the shaft bearing.

16 Claims, 4 Drawing Sheets

SHAFT BEARING

BACKGROUND OF THE INVENTION

The invention relates to a shaft bearing comprising an outer part and an inner part and an elastic element including an elastomer material disposed between the outer part and the inner part.

DE 28 51 018 A1 and DE 41 39 923 A1 discloses shaft bearings which include an outer part, an inner part and an elastic element including an elastomer material disposed between the outer part and the inner part. The outer part and the inner part are each in the form of hollow cylindrical support rings; the elastic element disposed therebetween is in the form of a rotationally symmetrical integrally formed bellows. The bellows accommodates axial as well as radial shaft bearing forces. The spring stiffnesses in radial and axial directions are therefore inseparably interconnected.

It is the object of the present invention to provide a shaft bearing wherein the spring stiffnesses in axial and in radial directions of the bearing can be selected independently of each other.

SUMMARY OF THE INVENTION

In a shaft bearing comprising outer and inner parts with an elastic element carrier disposed therebetween, the elastic element carrier includes first and second elastic elements disposed on opposite radial sides thereof and is movable with respect to one of the outer and inner parts in axial direction and with respect to the other of the outer and inner parts in radial direction, and the elastic elements disposed between the element carrier and the outer, and respectively, the inner parts have selectable elasticities so as to provide for distinct selectible radial and axial resiliencies of the shaft bearing.

Preferably, the first and the second elastic elements are arranged circumferentially uniformly distributed.

In an advantageous embodiment of the invention, the element carrier has radially inner and radially outer support areas distributed circumferentially, wherein the first elastic elements are disposed between the radially inner support areas of the element carrier and the outer part and the second elastic areas of the elastic element are disposed between the radially outer support areas of the element carrier and the inner part.

The first and the second elastic elements may be arranged alternately in the circumferential direction.

Furthermore, the first and/or second elastic elements may be vulcanized onto the element carrier.

In a particular embodiment of the invention, the second elastic elements are attached to the element carrier in a form-locking manner.

The element carrier can be formed by a metal sheet member or a cast or a molded structure. It is manufactured for example by a fine casting process, an aluminum pressure casting process or a plastic injection molding process.

Preferably, the axial end side walls of the second support areas of the element carrier extend radially inwardly and, if the element carrier is a metal sheet member, comprises inwardly bent plate structures by which the second elastic elements are held by the element carrier in a form-locking manner so as to prevent axial displacement of the elastic elements.

The second elastic elements may be in the form of ring segments. In a preferred embodiment of the invention, the three first elastic elements and the three second elastic elements are alternately arranged in the circumferential direction.

An embodiment of the invention will be described below on the basis of the accompanying drawings.

DESCRIPTION OF A PARTICULAR EMBODIMENT

Figures 1A, 1B:
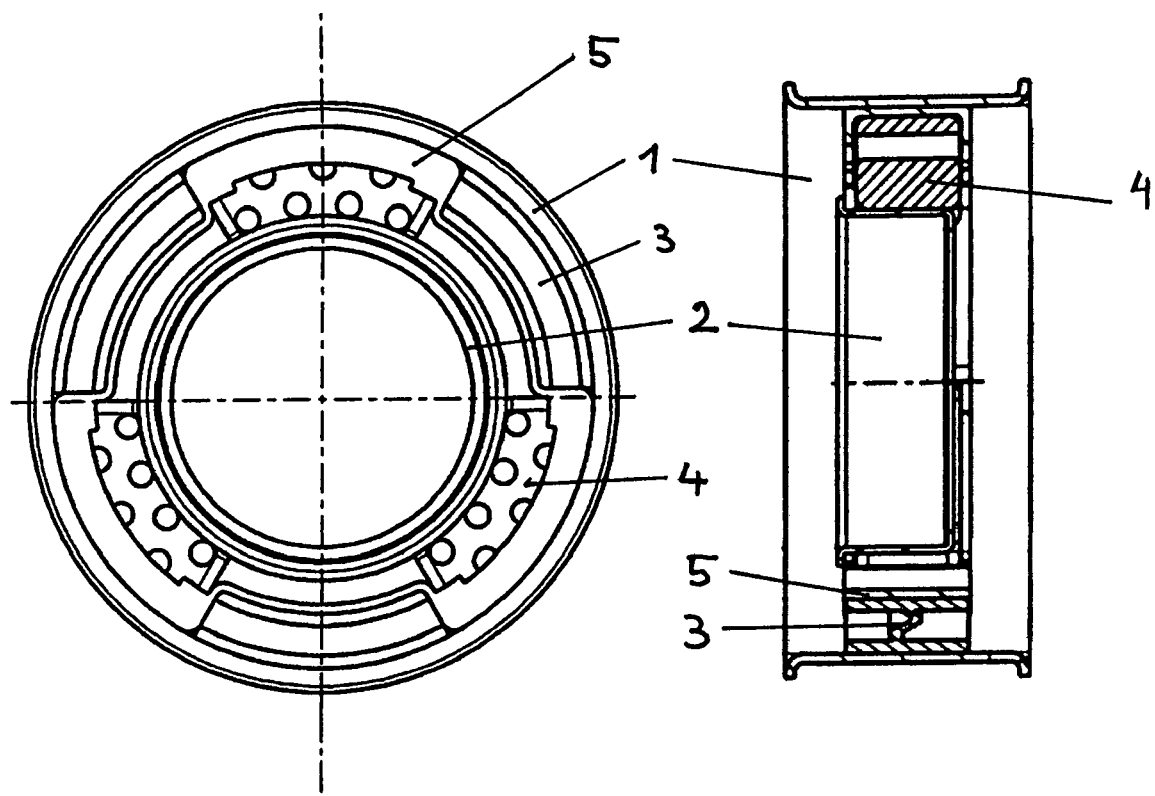
FIG. 1a is a view in an axial direction of a shaft bearing according to the invention.
FIG. 1b shows the bearing in an axial cross-sectional view, wherein an outer part, an inner part and an elastic element carrier disposed between the outer and inner parts is visible.
Figure 2:
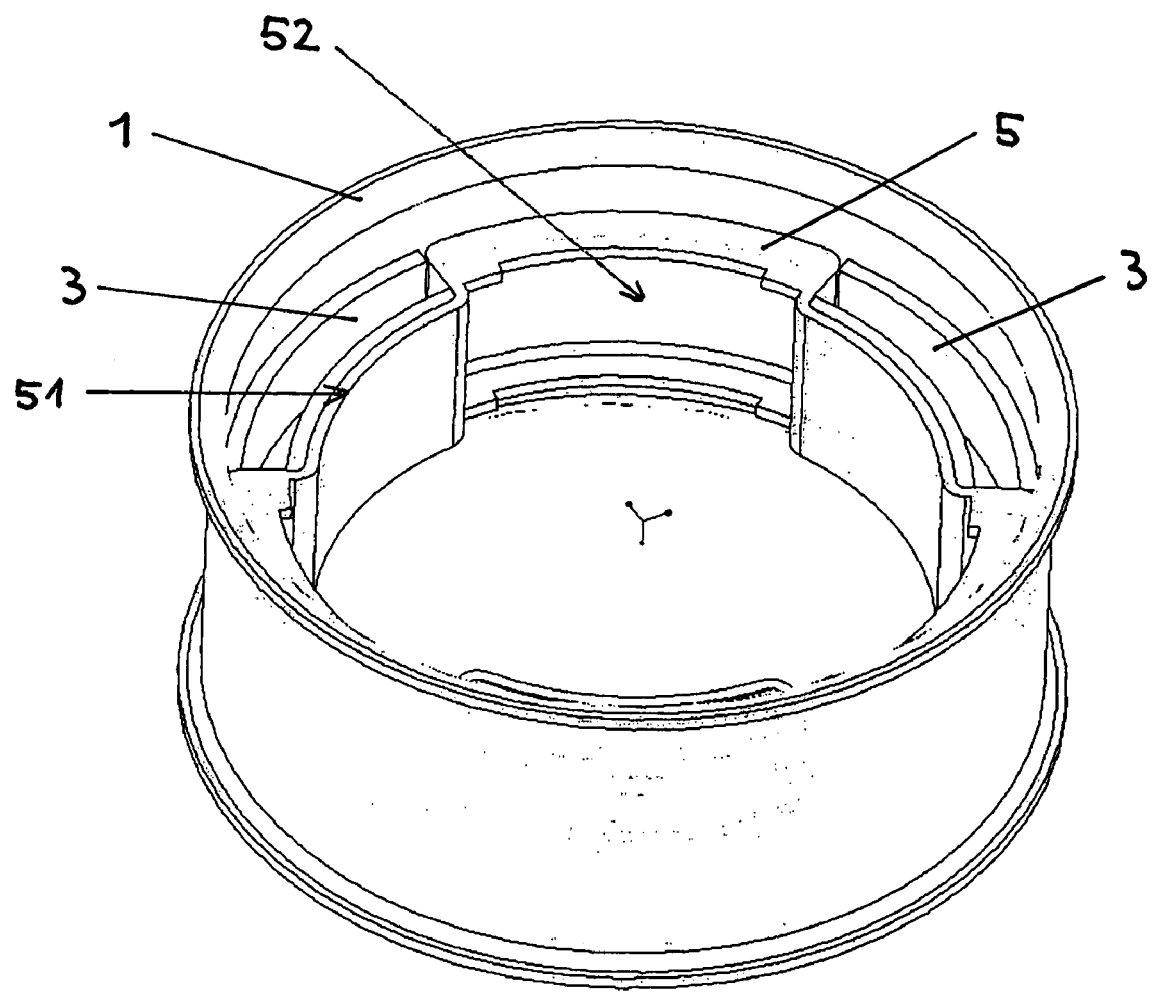
FIG. 2 shows, in a perspective view, the outer part of the shaft bearing of FIG. 1, including an element carrier and the areas accommodating the elastic elements.

The shaft bearing, the components of which are shown in FIGS. 1 to 4 comprises an outer part 1, an inner part 2 and an elastic element carrier 5 with elastic elements 3,4 disposed between the outer part 1 and the inner part 2. The elastic element carrier 5 engages the first elastic elements 3 and second elastic elements 4 and retains them between the outer part 1 and the inner part 2.

The outer part 1 and the inner part 2 are each in the form of hollow cylindrical bodies. The element carrier 5 has three circumferentially distributed first support areas 51 and three radially more outwardly disposed second support areas 52 of which the first support areas 51 extend radially further inwardly than the second support areas 52. Between the radially inner first support areas 51 of the element carrier 5 and the outer part 1 first elastic elements 3 are arranged and between the radially outer second support areas 52 of the element carrier 5 and the inner part 2 the second elastic elements 3 are arranged. In the figures, three inner first support areas 51 and three outer second support areas 52 are shown, for receiving the three first elastic elements 3 and the three second elastic elements 4 which are arranged alternately and circumferentially distributed.

The radially outer second support areas 52 of the element carrier 5 have partially cylindrical outer surface areas adapted to the inner surface of the outer part which they abut slidingly so that the element carrier 5 is radially supported by the outer part but axially movable therein.

As apparent particularly from the lower part of the cross-sectional view of FIG. 1b, the first elastic elements 3 are formed by bellows elements, which accommodate the axial movement occurring between the element carrier 5 and the outer part 1 because, as described, these parts are axially movable relative to one another but, at the same time, radially supported relative to each other.

The second elastic elements 4 are formed by elastomer blocks which are specifically designed for accommodating radial movements. These elastomer blocks 4 are clearly visible in the upper part of the cross-sectional view of FIG. 1b and in FIG. 3 in a perspective view.

Figure 3:
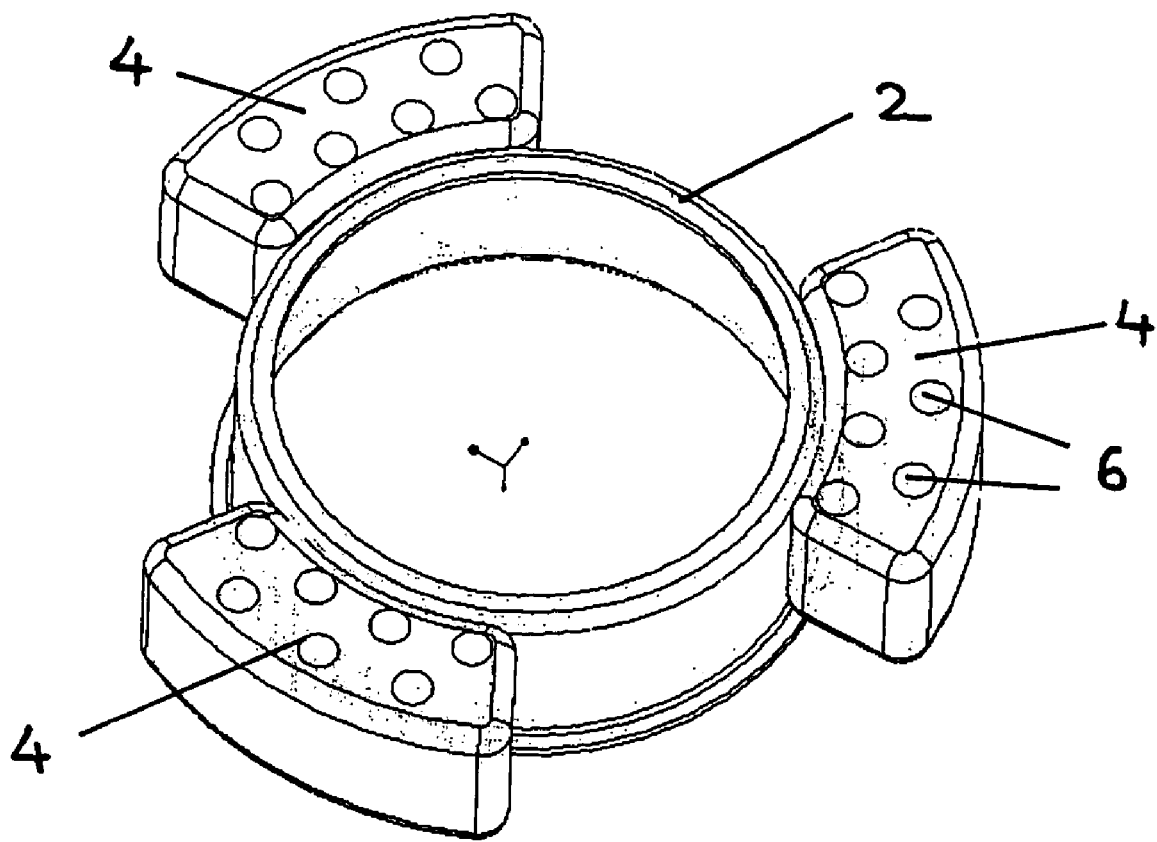
FIG. 3 shows the inner part of the shaft bearing of FIG. 1 including the elastic elements disposed on the inner part and, FIG. 4 shows the element carrier of the shaft bearing of FIG. 1.

As also shown in FIG. 1b and FIG. 3, the elastomer blocks 4 are provided with bores 6 which extend through the elastomer block in the axial direction of the shaft bearing and via which a certain radial resiliency of the elastomer blocks can be provided or is adjustable. These bores 6 as well as other openings or recesses can be provided selectively in various dimensions and configurations.

Figure 4:
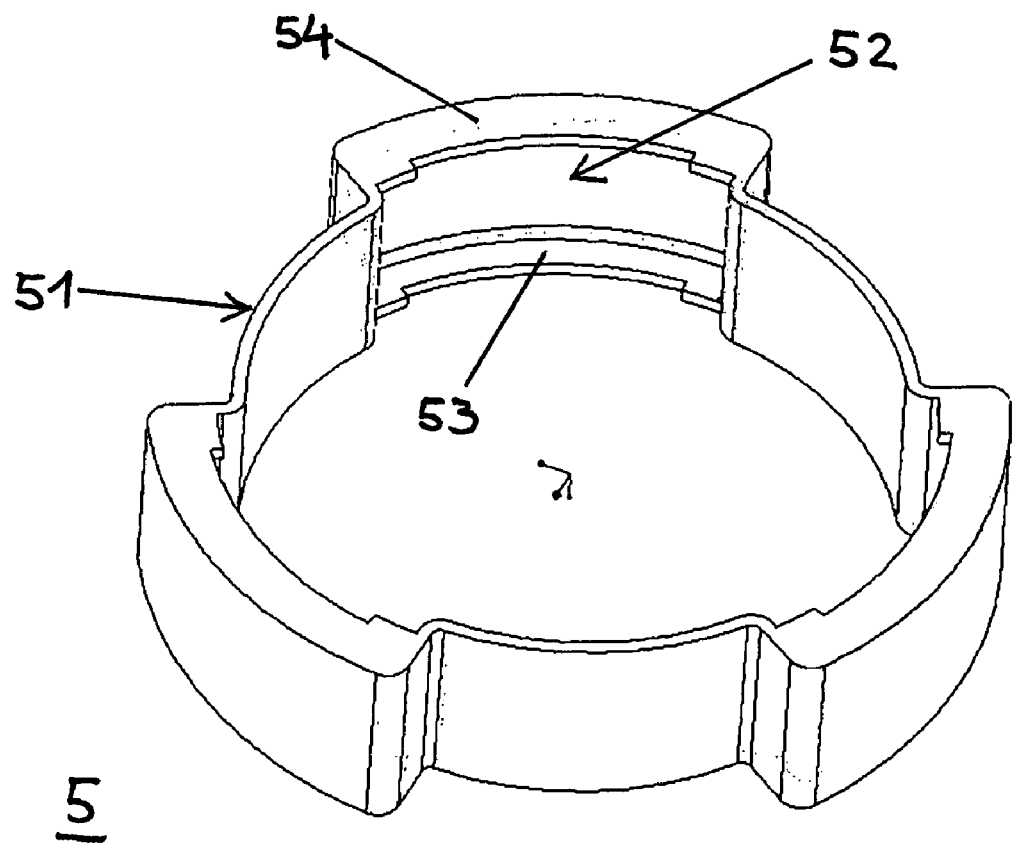

In the shown embodiment, the first elastic elements 3 in the form of bellows elements are vulcanized to the inner side of the outer part 1 and also to the outer side of the first support area 51 of the element carrier 5 which is disposed radially further inwardly. In this way, a stable, play-free and durable connection of these bellow elements to the outer part 1 and the element carrier 5 is established. Furthermore, in the embodiment shown, the second elastic elements provided in the form of elastomer blocks are vulcanized to the outside of the inner part 2. In the embodiment shown herein, the second elastic elements 4 which are formed by the elastomer blocks are attached to the element carrier 5 or, more accurately said, to the inner side of the second support areas 52 thereof which are arranged further outwardly and with which they are engaged in a form-locking manner. To this end, the element carrier 5, which is shown alone in FIG. 4, is formed from a metal sheet which, at the axial ends of the radially outwardly projecting second support areas 52, is provided with radially inwardly bent cover plates 53, 54 by which the elastomer blocks 4 are axially retained and held in form-locking engagement with the element carrier 5.

In this way, shaft bearings with different properties can be provided by assembly techniques whereby, on one hand, the components formed by the outer part 1, the element carrier 5 and the vulcanized bellows elements forming the first elastic elements 3, the elastomer blocks forming the second elastic elements 4 and the inner part 2 are joined so as to provide for different axial an radial spring resiliencies. For the establishment of the different spring resiliencies of the elastomer blocks 4 vulcanizing tools may be used with correspondingly different inserts can for providing different suitable diameters and/or arrangements of the bores and the recesses 6.

In the embodiment shown, the second elastic elements 4, which are formed by the elastomer blocks, have the shape of segments of a circular ring. The bellows forming the first elastic elements 3 have the shape shown in FIG. 1b in cross-section. Instead, the first and the second elastic areas 3, 4, however, may have other shapes. Also, the elastic areas for accommodating radial movements may be provided on the outside and the elastic areas provided for accommodating axial movement may be provided on the inside of the element carrier 5.

Furthermore, the elastic elements which are mainly provided for the accommodation of radial movements and the other elastic elements which are mainly provided for the accommodation of axial movements may, to a certain degree, also be capable to accommodate axial and, respectively, radial movements.

What is claimed is:

1. A shaft bearing comprising an outer part (1), an inner part (2) disposed within the outer part (1), an elastic element carrier (5) disposed between the outer part (1) and the inner part (2), first elastic elements (3) disposed between the elastic element carrier (5) and the outer part (1) and second elastic elements (4) disposed between the elastic element carrier (5) and the inner part (2), said first and second elastic elements (3, 4) having different spring rigidities and being arranged alternately in circumferential direction and uniformly distributed over the circumference of the shaft bearing and said element carrier (5) being supported so as to be movable mainly axially with respect to one of the outer part (1) and the inner part (2) and mainly radially with respect to the other of the inner and outer parts (1,2).

2. The shaft bearing according to claim 1, wherein the carrier element (5) includes distributed over the circumference thereof radially inner first support areas (51) and radially outer second support areas (52), said first elastic elements (3) being disposed between the radially inner first support areas (51) of the element carrier (5) and the outer part (1) and the second elastic elements (4) being disposed between the radially outer second support area (52) of the element carrier (5) and the inner part (2).

3. The shaft bearing according to claim 2, wherein the outer part (1) has a hollow cylindrical inner surface and the radially outer second support areas (52) of the element carrier (5) includes partial cylindrical outer surface areas adapted to the hollow cylindrical inner surface of the outer part (1) so as to be supported thereby in such a way that the element carrier (5) is radially supported and axially slidable in the outer part (1).

4. The shaft bearing according to claim 2, wherein the support area (52) of the element carrier (5) includes end walls (53, 54), which extend radially inwardly and by which the second elastic elements (4) are engaged in a form-locking manner for preventing axial movement of the second elastic elements (4) relative to the element carrier (5).

5. The shaft bearing according to claim 1, wherein the first elastic element (3) is formed by bellows elements accommodating axial movements.

6. The shaft bearing according to claim 5, wherein at least one of the first and the second elastic elements (3, 4) is vulcanized to the element carrier (5).

7. The shaft bearing according to claim 1, wherein the second elastic element (4) includes elastomer bodies for accommodating radial movements.

8. The shaft bearing according to claim 7, wherein the elastomer bodies (4) for the accommodation of radial movements include recesses, openings or bores (6) for providing a certain radial resiliency.

9. The shaft bearing according to claim 8, wherein the elastomer bodies (4) include a number of bores (6) extending parallel to the shaft bearing axis.

10. The shaft bearing according to claim 8, wherein the recesses, openings or bores (6) have at least one of different sizes and different arrangements.

11. The shaft bearing according to claim 1, wherein the first elastic elements (3) are vulcanized to the outer part (1).

12. The shaft bearing according to claim 1, wherein the second elastic elements (4) are vulcanized to the inner part (4).

13. The shaft bearing according to claim 1, wherein the second elastic elements (4) are supported by the element carrier (5) in a form-locking manner.

14. The shaft bearing according to claim 1, wherein the element carrier (5) is one of a sheet metal component, an aluminum pressure casting, a fine casting and a plastic injection molded component.

15. The shaft bearing according to claim 1, wherein the second elastic elements (4) have the shape of segments of a circular ring.

16. The shaft bearing according to claim 1, wherein three first elastic elements and three second elastic elements are provided and alternately arranged distributed over the circumference of the shaft bearing.

* * * * *